United States Patent
Gentry et al.

(10) Patent No.: US 8,561,017 B2
(45) Date of Patent: *Oct. 15, 2013

(54) METHODS AND APPARATUS FOR GENERATING A WEB SITE BASED ON A USE CASE

(75) Inventors: Joshua E. Gentry, Westford, MA (US); John A. Kowalonek, Clinton, MA (US)

(73) Assignee: Sorriso Technologies Inc., Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,847

(22) Filed: Jul. 18, 2011

(65) Prior Publication Data

US 2011/0276940 A1    Nov. 10, 2011

Related U.S. Application Data

(63) Continuation of application No. 11/760,319, filed on Jun. 8, 2007, now Pat. No. 8,006,226.

(60) Provisional application No. 60/812,701, filed on Jun. 9, 2006.

(51) Int. Cl.
*G06F 9/44*   (2006.01)

(52) U.S. Cl.
USPC ............ 717/106; 717/101; 717/108; 717/116

(58) Field of Classification Search
USPC ................... 717/106–123, 170; 715/700–866
See application file for complete search history.

(56) References Cited

U.S. PATENT DOCUMENTS

| 5,875,331 | A * | 2/1999 | Lindsey | 717/108 |
|---|---|---|---|---|
| 6,681,383 | B1 * | 1/2004 | Pastor et al. | 717/126 |
| 2003/0110472 | A1 * | 6/2003 | Alloing et al. | 717/122 |
| 2003/0233631 | A1 * | 12/2003 | Curry et al. | 717/100 |
| 2004/0221260 | A1 * | 11/2004 | Martin et al. | 717/104 |

OTHER PUBLICATIONS

Fraternali et al., A Conceptual Model and a Tool Environment for Developing More Scalable, Dynamic, and Customizable Web Applications, fetched on Oct. 18, 2012, pp. 421-435.*

Fons et al., Development of Web Applications from Web Enhanced Conceptual Schemas, Springer-Verlag Berlin Heidelberg 2003, LNCS 2813, pp. 232-245.*

Rossi et al., Designing Personalized Web Applications, May 1-5, 2001, Hong Kong. ACM, pp. 275-284.*

* cited by examiner

*Primary Examiner* — Wei Zhen
*Assistant Examiner* — Satish Rampuria
(74) *Attorney, Agent, or Firm* — Chapin IP Law, LLC

(57) ABSTRACT

A system obtains at least one requirement for the application. They system defines at least one interaction, as a use case, associated with the application that satisfies at least one requirement. The system creates at least one file associated with at least one interaction, and processes at least one file with a code-generating engine to automatically generate at least one interactive component of the application.

16 Claims, 8 Drawing Sheets

222 PROCESS THE AT LEAST ONE FILE WITH A CODE-GENERATING ENGINE TO AUTOMATICALLY GENERATE AT LEAST ONE COMPONENT OF THE APPLICATION

223 DETERMINE, FROM THE AT LEAST ONE FILE ASSOCIATED WITH THE AT LEAST ONE INTERACTION, A CATEGORY OF DATA ASSOCIATED WITH THE AT LEAST ONE INTERACTION, THE CATEGORY INCLUDING AT LEAST ONE OF:
i) DATA TO DISPLAY TO AT LEAST ONE ACTOR,
ii) DATA TO RETRIEVE FROM THE AT LEAST ONE ACTOR

224 PROVIDE A GRAPHICAL USER INTERFACE CAPABLE OF RENDERING THE CATEGORY DATA ASSOCIATED WITH THE AT LEAST ONE INTERACTION

225 CREATE AT LEAST ONE XML FILE DEFINING THE CATEGORY DATA ASSOCIATED WITH THE AT LEAST ONE INTERACTION

226 GENERATE AT LEAST ONE WEB PAGE FROM THE AT LEAST ONE XML FILE, THE AT LEAST ONE WEB PAGE RENDERING THE CATEGORY DATA ASSOCIATED WITH THE AT LEAST ONE INTERACTION

*FIG. 8*

METHODS AND APPARATUS FOR GENERATING A WEB SITE BASED ON A USE CASE

CROSS REFERENCE TO RELATED APPLICATIONS

This Patent Application is a Continuation of U.S. patent application Ser. No. 11/760,319 filed on Jun. 8, 2001, now U.S. Pat. No. 8,006,226 entitled, "Methods and Apparatus for Generating a Web Site Based on a Use Case" which claimed the benefit of priority of U.S. Provisional Patent Application No. 60/812,701, filed on Jun. 9, 2000 entitled, "Methods and Apparatus for Generating a Web Site Based on a Use Case", the contents and teachings of which are hereby incorporated by reference in their entirety.

BACKGROUND

Graphical user interfaces provide mechanisms for a software application and related processes operating on a computer system to graphically present information to a user of the computer system. There are numerous conventional techniques that a software application can utilize to generate or construct information to be presented within a graphical user interface. As an example, a software program may be configured with software code that produces data, graphics or other information encoded in one or more pages of a markup language such as the hypertext markup language (HTML). A software program such as a browser may display the HTML pages for presentation of the data, graphics or other information to user on computer display or monitor. As another example, a software application may encode information in extensible markup language (XML) in order to allow this information to be transferred to other software applications for various processing purposes. A software application equipped to utilize XML processing technologies can apply an extensible style sheet language (XSL) style sheet or an XSL transformation (XSLT) to process or convert a raw XML data source formatted in one manner into an output format that can be displayed on a graphical user interface. As a specific example, XSLT can perform an XML to HTML transformation so that XML encoded data can be displayed within an HTML compatible interface.

Typically, conversion of an XML data source using an XSL style sheet into a format that can be rendered in a graphical user interface requires that an application developer build Java™ classes. As an example, if an XML data source contains financial information and a user desires to see different types of reports concerning various relationships expressed in the data within the financial information, a software developer can use XSL and an XSLT tool to extract the desired data and then creates a Java™ class for each different type of report that the user desires to view. The Java™ classes are responsible for formatting the particular extracted XML information from the XML data source for presentation in a report such as a particular table style or graph within the graphical user interface. Java is a trademark of Oracle Corporation, Redwood Shores, Calif., USA.

SUMMARY

Conventional technologies for creating applications (i.e., software applications, web based applications, etc.), suffer from a variety of deficiencies. In particular, conventional technologies for creating applications are limited in that users creating applications must be skilled in the language in which the applications are coded. Once those applications are created, modifications and/or enhancements to the applications also require coding knowledge and skill, and may prove even more difficult than the actual creation of the application. For example, a user might have to modify/enhance an application that was created by another user. This forces the user (tasked with making modifications and/or enhancements to an application) to understand the logical thought process of the user who initially created the application.

In addition to the high level of skill needed to write code for applications, there often exists a disconnect between the requirements of an application, and the interpretation of those requirements by the user who creates the application (i.e., writes the code). For example, a requirement of an application may be that the application is 'easy to use'. The user who creates the application may assume that all users of the application are as technically proficient as the user creating the application. However, actual users of the application might possess varying levels of technical proficiency. Thus, there may be varying interpretations of the 'easy to use' requirement. The end result application may be far too complex for users of varying levels of technical proficiency while still being 'easy to use' for those on the same level of technical proficiency as the user creating the application.

One solution to this problem is the practice of 'use cases'. Use cases capture the functional requirements of an application, often by detailing the interactions between an actor (i.e., an end user of the application), and the application. Typically, once a use case is defined, the use case is handed off to an engineer creating the application who, in turn, develops the application, from scratch, based on the details and/or requirements of the use case. While the practice of use cases eliminates some of the miscommunication between actual requirements of the application, and the end functionality of the application, the need to create the code of the application from scratch is inefficient.

Embodiments disclosed herein significantly overcome such deficiencies and provide a system that includes a computer system executing an application creating process that transforms a use case into an application. It should be noted that the term use case may include, but is not limited to fully dressed use cases, extended use cases (i.e., a fully dressed use case with additional information included), etc. The application creating process obtains a requirement for the application. A use case is defined for the requirement. The use case defines at least one interaction, as a use case, associated with the application, for example, a user/actor interacting with the application. The use case is processed through a code generating engine that generates an interactive component of the application that satisfies the requirement. The interactive component is then implemented into the application. In an example embodiment, data objects that interface with the application are created, and implemented. For example, a data object may be a database query that interacts with a database providing data during operation of the application.

The use case defines the user experience with the application. Often a use case defines a user as an actor having a role in the interaction with the application. In an example embodiment, the use case can also specify restrictions that limit the role of an actor within the interaction.

By creating a use case that satisfies a requirement of the application, and then directly generating code implemented in the application, defects are significantly reduced, and the time required to develop the application is significantly reduced. The majority of defects stem from inconsistencies between how a client wanted the application to perform (as detailed in the use cases defining the interaction between an actor and the application), and how an engineer coding the application interpreted the requirement specified by the client. Embodiments disclosed herein provide an application creating process that allows engineers to expand upon the use case to create the interactive component of the application (that satisfies the requirement) rather than using the use case as a specification while coding the interactive component from scratch. Thus, enhancements to the application are quickly, and easily accomplished by modifying the use case. Then, the modified use case is processed through the code generating engine to create the updated interactive component that satisfies the requirement specified by the enhancement.

In an example embodiment, the application is a web application, and the use case is processed through the code generating engine to create an eXtensible Markup (XML) file, for example, an XML datastream, along with an eXtensible Stylesheet Language Transform (XSLT) that transforms the XML to an HyperText Markup Language (HTML) web page. In an example embodiment, the code generating engine determines, from the use case, what data to display on the web page, and what data is required as input from an actor (interacting with the application). The engine creates an XML datastream that defines the data to display, and the data to be received from the actor. The XML datastream is processed through the code generating engine to create a web page. Thus, in a few short steps, a client can interact with a fully functional version of the application. Any modification and/or enhancements are easily incorporated into the application by modifying the use case and processing the modified use case through the code generating engine as explained above.

The application creating process obtains at least one requirement for the application. The application creating process defines at least one interaction, as a use case, associated with the application that satisfies at least one requirement. The application creating process then creates at least one file, for example, a use case file, associated with at least one interaction, and processes at least one file with a code-generating engine to automatically generate at least one interactive component of the application.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Sorriso Technologies, Inc., of Acton Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 8 illustrates a flowchart of a procedure performed by the system of FIG. 1 when the application creating process processes at least one file with a code-generating engine to automatically generate at least one interactive component of the application, according to one embodiment disclosed herein.

DETAILED DESCRIPTION

Embodiments disclosed herein include methods, software and a computer system that performs an application creating process that obtains at least one requirement for the application. The application creating process defines at least one interaction, as a use case, associated with the application that satisfies at least one requirement. The application creating process then creates at least one file, for example, a use case file, associated with at least one interaction, and processes at least one file with a code-generating engine to automatically generate at least one interactive component of the application.

Figure 1:
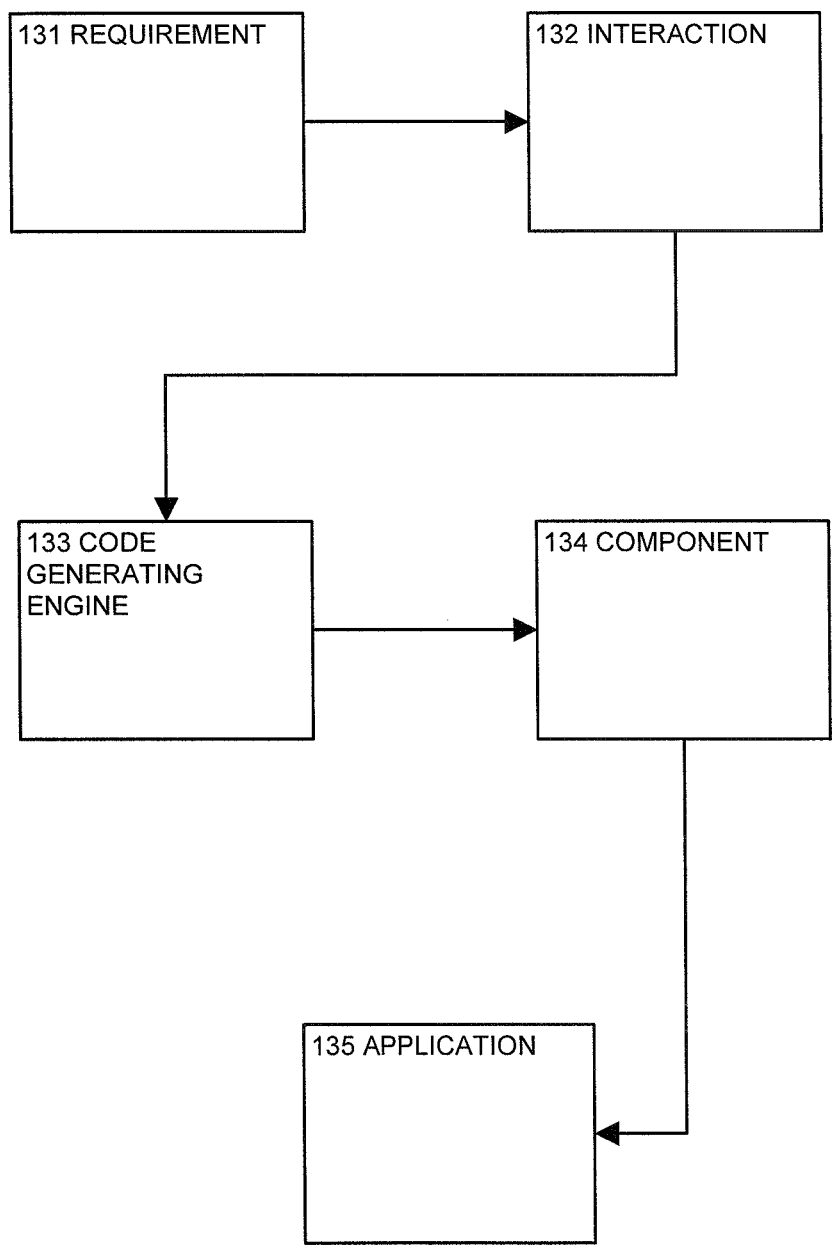
FIG. 1 is a block diagram according to one embodiment disclosed herein.

FIG. 1 is a block diagram illustrating example embodiments disclosed herein. The application creating process 140-2 obtains a requirement 131 for the application 135. A use case is defined for the requirement 131. The use case defines at least one interaction 132 associated with the application 135, for example, a user/actor interacting with the application 135. The use case is processed through a code generating engine 133 that generates a interactive component 134 of the application 135 that satisfies the requirement 131. The interactive component 134 is then implemented into the application 135.

Figure 2:
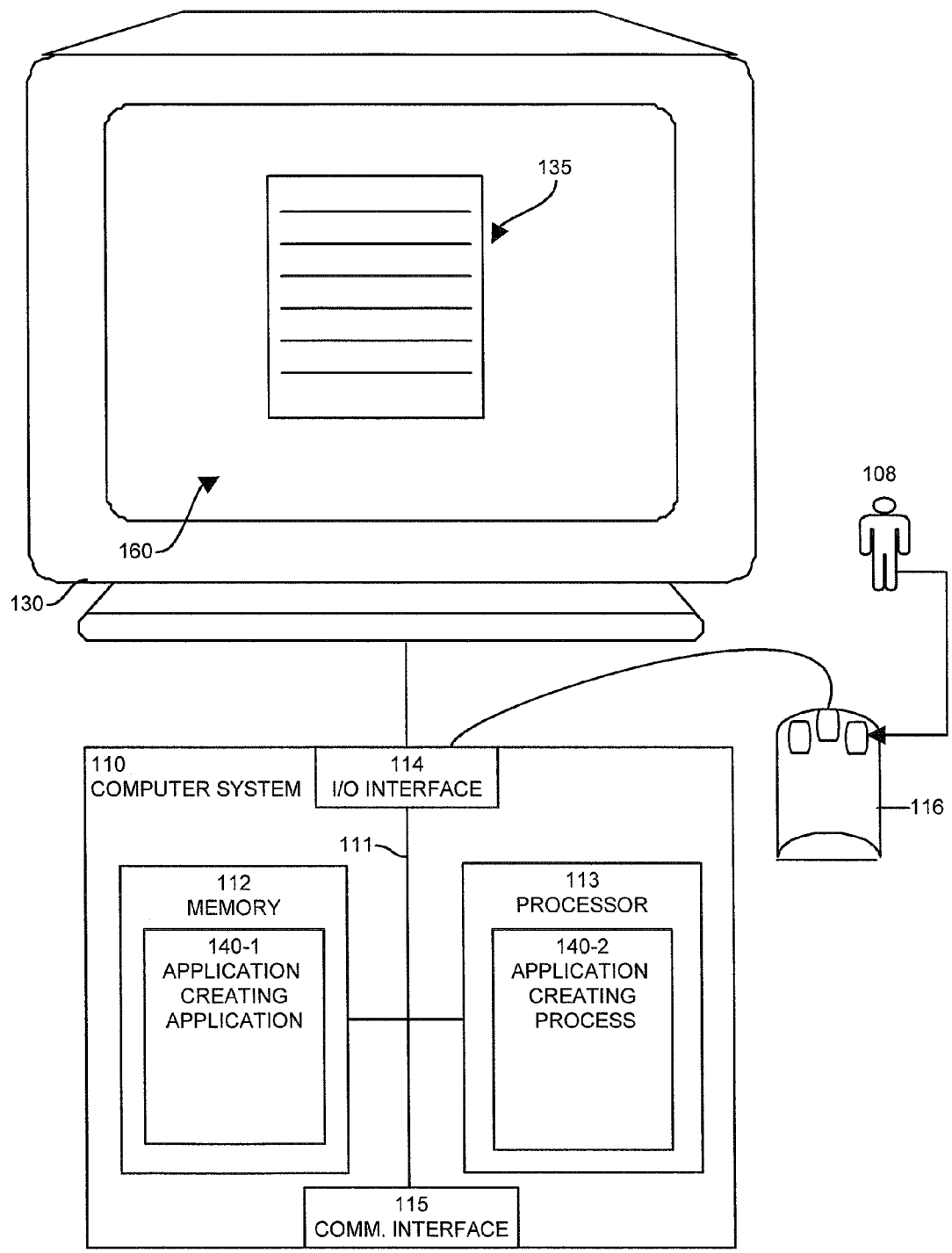
FIG. 2 shows a high-level block diagram of a computer system according to one embodiment disclosed herein.

FIG. 2 is a block diagram illustrating example architecture of a computer system 110 that executes, runs, interprets, operates or otherwise performs an application creating application 140-1 and application creating process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a actor 108 to provide input commands, and generally control the graphical user interface 160 that the application creating application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown). The graphical user interface 160 renders an application 135 that is generated as a result of processing use cases through a code generating engine creating interactive components 134 of the application 135.

The memory system 112 is any type of computer readable medium, and in this example, is encoded with an application creating application 140-1 as explained herein. The application creating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the application creating application 140-1. Execution of the application creating application 140-1 in this manner produces processing functionality in an application creating process 140-2. In other words, the application creating process 140-2 represents one or more portions or runtime instances of the application creating application 140-1 (or the entire application creating application 140-1) performing or executing within or upon the processor 113 in the computerized device 110 at runtime.

It is noted that example configurations disclosed herein include the application creating application 140-1 itself (i.e., in the form of un-executed or non-performing logic instructions and/or data). The application creating application 140-1 may be stored on a computer readable medium (such as a floppy disk), hard disk, electronic, magnetic, optical, or other computer readable medium. The application creating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the application creating application 140-1 in the processor 113 as the application creating process 140-2. Those skilled in the art will understand that the computer system 110 may include other processes and/or software and hardware components, such as an operating system not shown in this example.

A display 130 need not be coupled directly to computer system 110. For example, the application creating application 140-1 can be executed on a remotely accessible computerized device via the network interface 115. In this instance, the graphical user interface 160 may be displayed locally to an actor 108 of the remote computer, and execution of the processing herein may be client-server based.

Further details of configurations explained herein will now be provided with respect to a flow chart of processing steps that show the high level operations disclosed herein to perform the application creating process 140-2.

Figure 3:
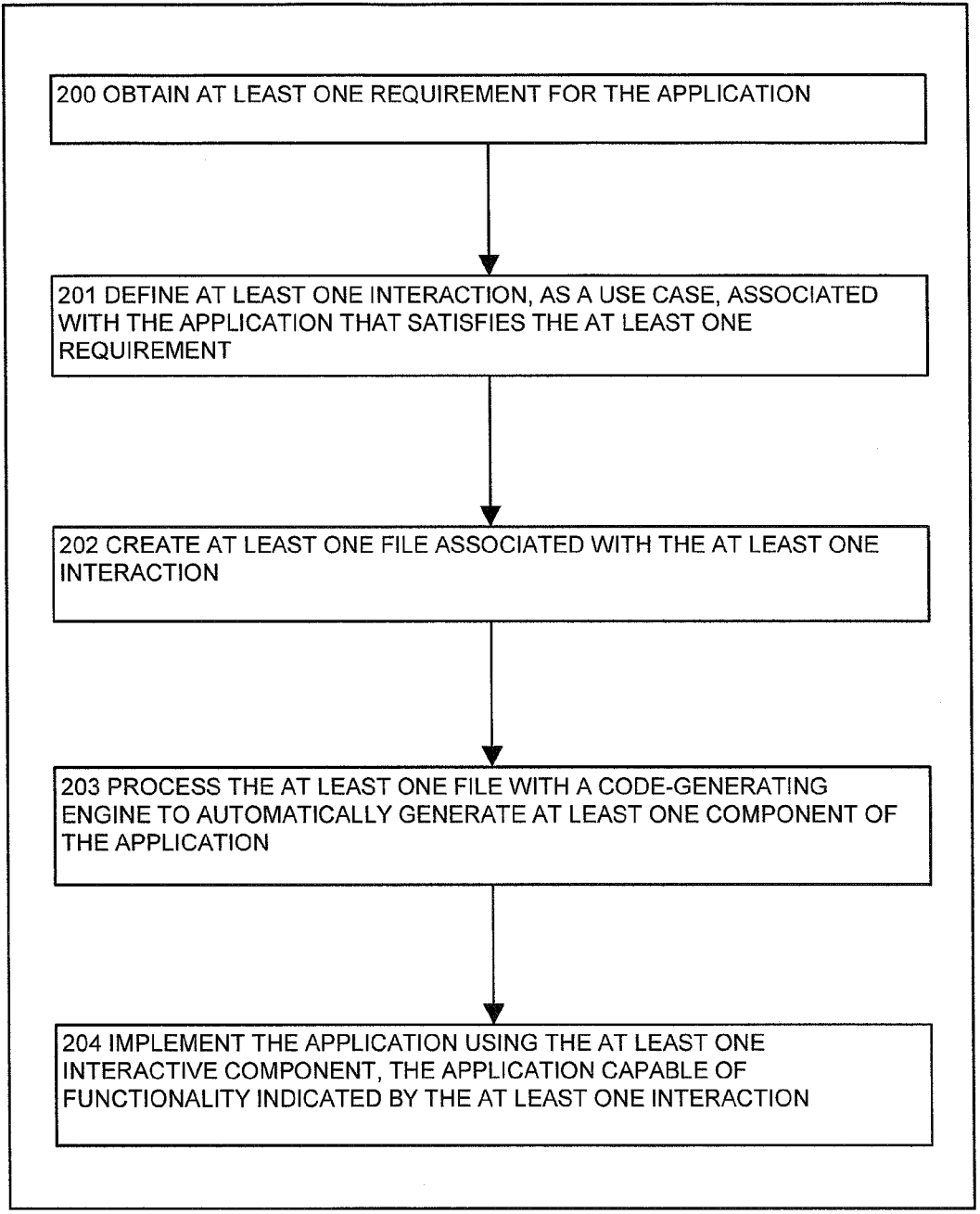
FIG. 3 illustrates a flowchart of a procedure performed by the system of FIG. 1 when the application creating process obtains at least one requirement for the application, according to one embodiment disclosed herein.

FIG. 3 is a flowchart of the steps performed by the process 140-2 when it obtains at least one requirement 131 for the application 135.

In step 200, the application creating process 140-2 obtains at least one requirement 131 for the application 135. The lifecycle of an application 135 may include several phases including a discovery phase, elaboration phase, a build phase and a transition phase. During the discovery phase, high level requirements 131 of the application 135 are specified. For example, one requirement 131 of an application 135 may be, 'Must allow customers to purchase with a credit card via a web application". During the elaboration phase, the requirements 131 are further defined, and the details of the requirements 131 are documented. These documented details of the requirements 131 may be used to create the use cases.

In step 201, the application creating process 140-2 defines at least one interaction 132 associated with the application 135 that satisfies at least one requirement 131. In an example embodiment, the interaction 132 is the basis of the use case that is used to generate the code for the application 135. A use case may specify interactions between an actor 108 and the application 135. The use case may also specify what data is to be entered (i.e., inputted by an actor 108) into the application 135, and what is the expected response from the application 135.

In step 202, the application creating process 140-2 creates at least one file associated with at least one interaction 132. The use case is rendered as a file for future processing through the code generating engine 133. The use case is documented, for example, in pseudo code, that is easy enough to be understood by a lay person (i.e., a person not familiar with the syntax of code), yet still captures the logical process underlying the use case. It is the logical process, i.e., the algorithm that is typically used by engineers to develop code.

In step 203, the application creating process 140-2 processes at least one file with a code generating engine 133 to automatically generate at least one interactive component 134 of the application 135. In an example embodiment, the application creating process 140-2 uses the actual use case (rendered as a file) that was generated as a result of the requirements 131 specified within the discovery phase. The code generating engine 133 processes the file (i.e., the documented use case) to produce code that is capable of operating within the application 135.

In step 204, the application creating process 140-2 implements the application 135 using at least one interactive component 134. The application 135 is capable of functionality indicated by at least one interaction 132 (i.e., the interaction 132 specified within the use case). For example, a requirement 131 of an application 135 may be that a help menu is available to an actor 108 when the actor 108 uses the application 135. That requirement 131 is used to create a use case that is documented in a file. The file is processed through the code generating engine 133 creating a help menu component 134. The help menu component 134 is implemented into the application 135. Thus, the requirement 131, that the application 135 have a help menu, has been satisfied. Upon seeing the prototype version of the help menu, a prospective client may want to add additional features to the help menu. These additional features may be added to the use case (documented as a file) and re-processed through the code generating engine 133 to create the additional features of the help menu.

Figure 4:
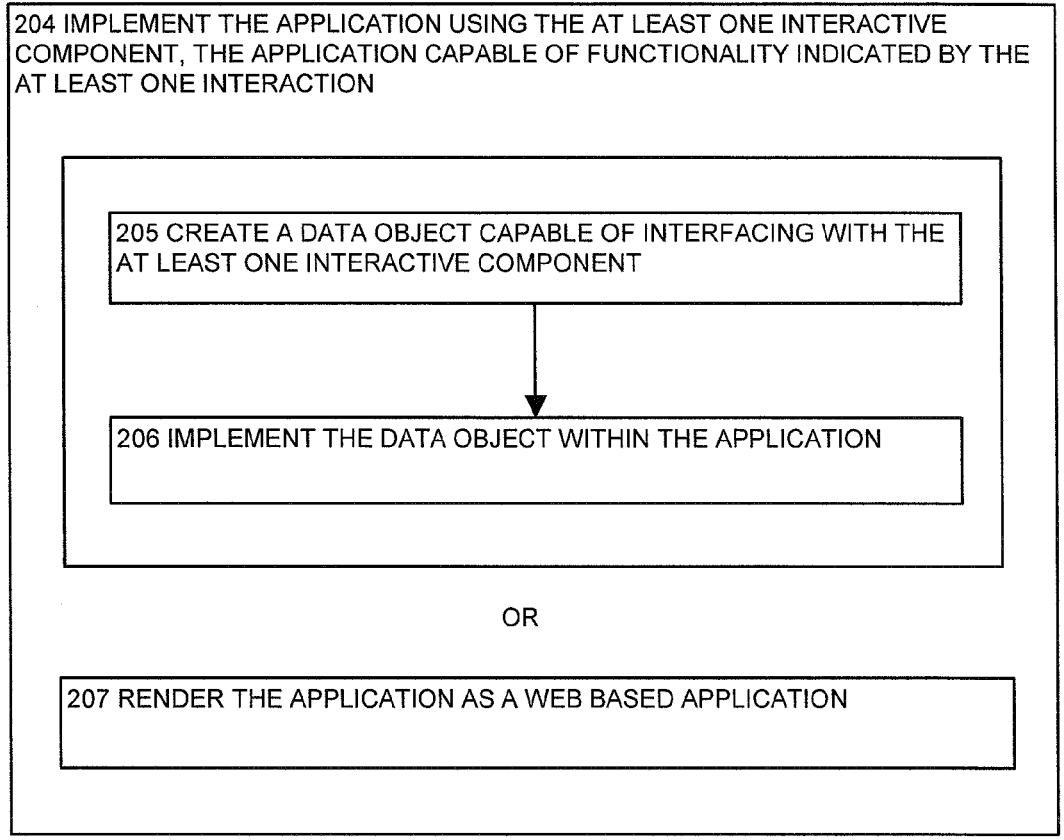
FIG. 4 illustrates a flowchart of a procedure performed by the system of FIG. 1 when the application creating process implements the application using at least one interactive component, the application capable of functionality indicated by at least one interaction, according to one embodiment disclosed herein.
Figure 5:
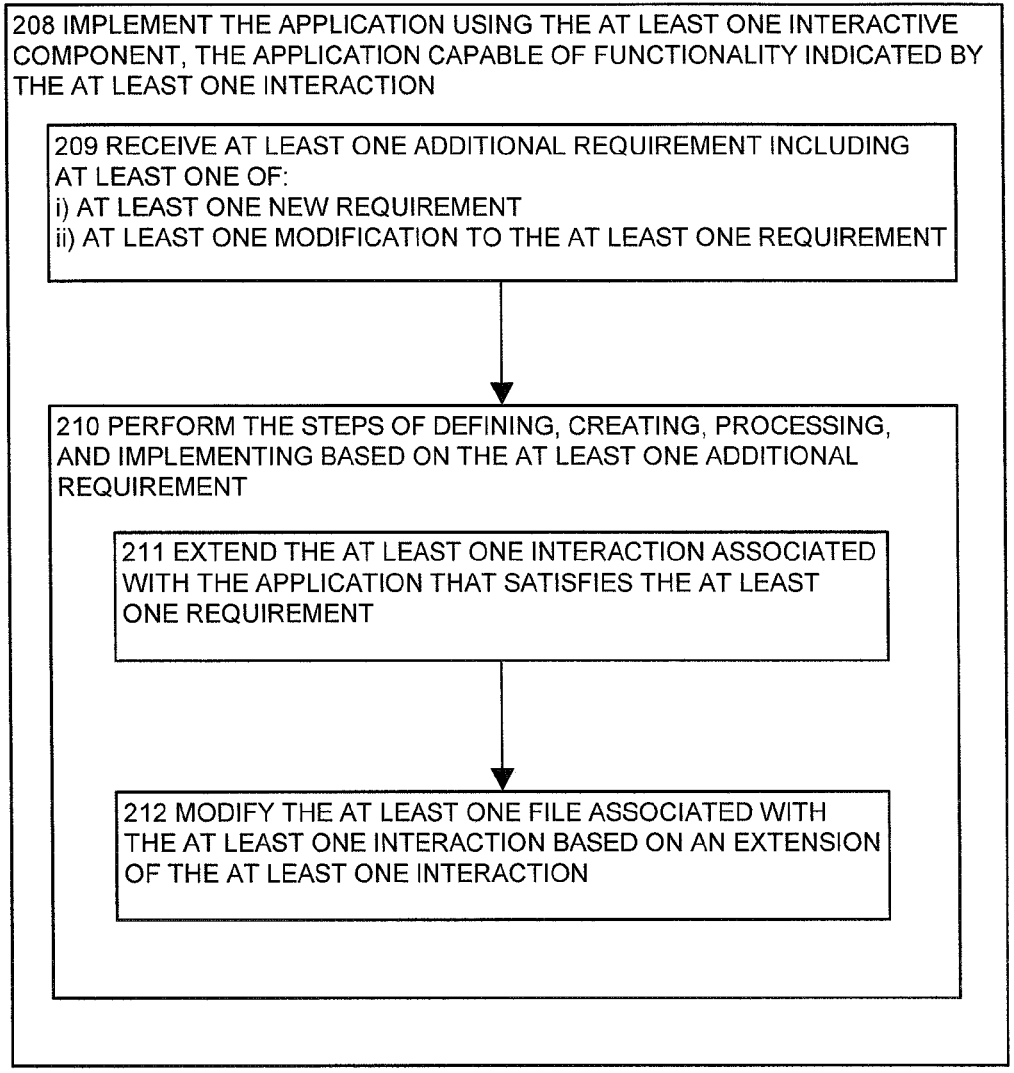
FIG. 5 illustrates a flowchart of a procedure performed by the system of FIG. 1 when the application creating process implements the application using at least one interactive component, and receives at least one additional requirement, according to one embodiment disclosed herein.

FIG. 4 is a continuation of FIG. 3 and is an example flowchart of the steps performed by the process 140-2 when it implements the application 135 using at least one interactive component 134 as explained above in step 204.

In step 205, the application creating process 140-2 creates a data object capable of interfacing with at least one interactive component 134. The data object may be, but is not limited to, a database object, a Java™ object, etc. Java is a trademark of Oracle Corporation, Redwood Shores, Calif., USA. In an example embodiment, the data object is a database object. One attribute of the data object may be a Structured Query Language (SQL) query that manipulates data within a database. The attribute is then assigned to the data object.

In step 206, the application creating process 140-2 implements the data object within the application 135. The data object is interfaced with the application 135. The data object can be added or removed from the application 135. In an example embodiment, because the SQL query is an attribute of the data object, the SQL query can modified without modifying the application 135 within which the data object is implemented. Thus, the data provided by the SQL query may be modified simply by modifying the SQL query (without requiring additional coding of the application 135).

Alternatively, in step 207, the application creating process 140-2 renders the application 135 as a web based application, for example, within a web browser. The application 135 may be rendered as a web application, but is not limited to web applications. The application 135 may be rendered as a variety of applications 135 operational on different platforms.

Figure is 5 a flowchart of the steps performed by the process 140-2 when it implements the application 135 using at least one interactive component 134.

In step 208, the application creating process 140-2 implements the application 135 using at least one interactive component 134. The application 135 is capable of functionality indicated by at least one interaction 132 (i.e., the interaction 132 specified by the use case).

In step 209, the application creating process 140-2 receives at least one additional requirement 131 including at least one of:
  i) at least one new requirement 131, and
  ii) at least one modification to the at least one requirement 131.

Typically, one of the steps in creating an application 135 is to create a mock up of the actual application 135. The mock up demonstrates the 'look and feel' of the application 135. A mock up usually just provides an example of what the end user will see when interacting with the application 135. However, a mock up generally does not have back end functionality attached that allows a prospective end user to actually interact with the application 135.

The application creating process 140-2 significantly reduces the amount of time required to develop an application 135, and provides a mock up that includes the functionality of the application 135. In other words, in an example embodiment, the mock up is a working embodiment of the application without the backend completed. The same use case that will be executed in the production application is used during elaboration as the mock up. This eliminates the problem of engineers misinterpreting requirements that are defined by, for example, business analysts.

Thus, a prospective client (i.e., typically the provider of the requirements 131) is able to undergo the same user experience that the end user will have when interacting with the application 135. During the presentation of the functional mock up to a prospective client, it is common that new requirements 131 are requested, or existing requirements 131 are modified. Often, a prospective client that requires an application 135 may have an idea of what the application 135 should do, but might not be aware of the extent to which existing technology can enhance the end user experience. By interacting with a functional mock up, a prospective client is exposed to various ways in which existing technology can be incorporated into the application 135 to increase the functionality of the application 135, and improve the end user experience.

In step 210, the application creating process 140-2 performs the steps of defining, creating, processing, and implementing based on the at least one additional requirement 131. Providing a functional mock up of the application 135 ensures the engineers (creating the application 135) and the prospective client (who provided the requirements 131 for the application 135) that the development of the application 135 meets the requirements 131 of the prospective client. However, providing a functional mock up of the application 135 can also lead to 'scope creep' where a prospective client begins to add new requirements 131 or modify existing requirements 131 that weren't documented in the earlier discovery stage of the development of the application 135. Depending on the architecture of the software, additional requirements 131 (or changes to existing requirements 131) may be simple to resolve or may require additional intensive re-architecture of the application 135. The application creating process 140-2 provides an efficient technique by which new requirements 131 or modifications to existing requirements 131 are incorporated into the application 135 through the steps of defining, creating, processing, and implementing. The interaction 132 (i.e., the use cases) are modified per the new requirements 131 (or modifications to existing requirements 131), and then processed once again through the code generating engine 133 to create a modified/updated interactive component 134 of the application 135. The modified/updated interactive component 134 is then implemented in the application 135.

In step 211, the application creating process 140-2 extends at least one interaction 132 associated with the application 135 that satisfies at least one requirement 131. In an example embodiment, a new requirement 131 is defined or an existing requirement 131 is modified. An engineer extends an existing interaction 132 (i.e., use case) to incorporate the new or modified requirement 131. For example, a requirement 131 of an application 135 may specify that an actor 108 is able to make a purchase on a web site (i.e., an application 135) using a credit card. During a demonstration of the functional mock up of the application 135, a prospective client may modify that requirement 131 to include that the actor 108 may use a credit card on the web site (i.e., the application 135), and is also able to receive credit card approval, real time, during the transaction.

In step 212, the application creating process 140-2 modifies at least one file associated with the at least one interaction 132 based on an extension of at least one interaction 132. In an example embodiment, a requirement 131 has been modified to include not only an ability to make a purchase using a credit card, but also real time notification of credit card approval. In an example embodiment, an engineer modifies a file associated with the interaction 132 (i.e., use case). The file is then processed with the code generating engine 133 to create the modified interactive component 134 of the application 135 that provides the functionality of not only making a purchase using a credit care on a web site, but also provides real time credit card approval during the transaction.

Figure 6:
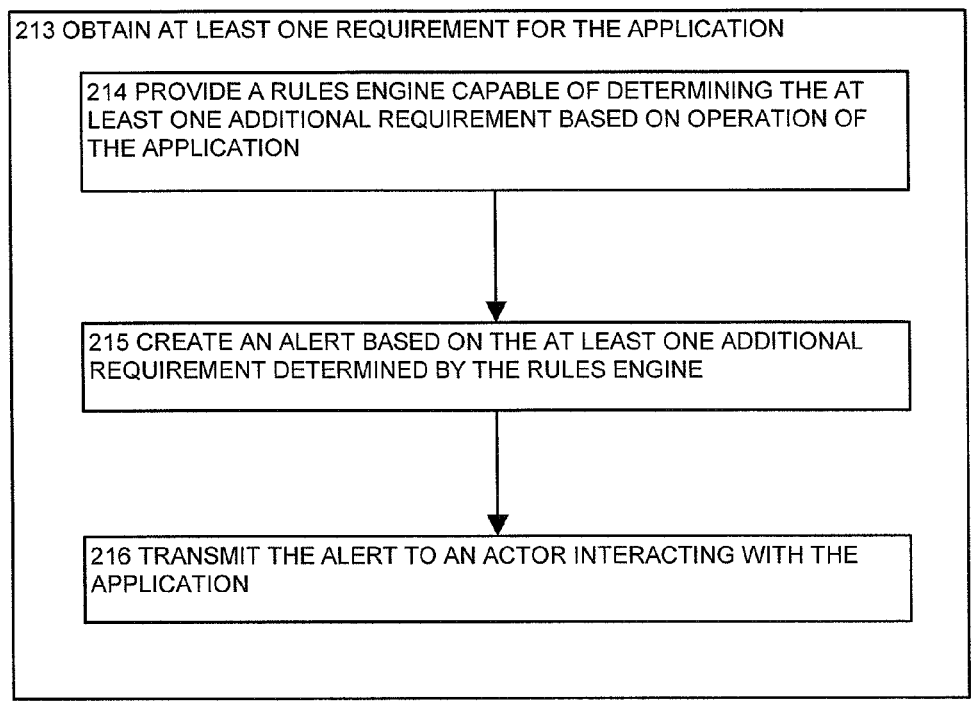
FIG. 6 illustrates a flowchart of a procedure performed by the system of FIG. 1 when the application creating process obtains at least one requirement for the application, and provides a rules engine capable of determining at least one additional requirement based on operation of the application, according to one embodiment disclosed herein.

FIG. 6 is a flowchart of the steps performed by the process 140-2 when it obtains at least one requirement 131 for the application 135.

In step 213, the application creating process 140-2 obtains at least one requirement 131 for the application 135. In an example embodiment, the interaction 132 is the basis of the use case that is used to generate the code for the application 135. The use case is rendered as a file that is processed through the code generating engine 133. In an example embodiment, the requirement 131 may be a feedback loop that examines data provided during the operation of the application 135 to create new requirements 131.

In step 214, the application creating process 140-2 provides a rules engine capable of determining at least one additional requirement 131 based on operation of the application 135. In an example embodiment, the rules engine creates rules based on data obtained by the application 135 during operation of the application 135. For example, an application 135 may provide billing information for a phone service provider. Based on the phone usage, the rules engine may determine that there exist various communities within users of the phone service. The rules engine may provide different incentives to users within the different communities based on ways in which those users can take better advantage of the service provided by the phone service provider. Thus, the rules engine determines a requirement 131 based on the operation of the application 135.

In step 215, the application creating process 140-2 creates an alert based on at least one additional requirement 131 determined by the rules engine. In an example embodiment, a rules engine examines data that results during operation of the application 135. The rules engine, for example, examines phone usage data of a phone service provider. The rules engine determines that there are users of the phone service that are making substantial amounts of international phone calls, for whom a different phone plan may result in lower bills for international phone calls. The rules engine determines an additional requirement 131 (i.e., that users of the phone service may benefit by switching to a different phone plan offered by the phone service provider) based on this information. The rules engine then creates an alert based on this new requirement 131.

In step 216, the application creating process 140-2 transmits the alert to an actor 108 interacting with the application 135. For example, the application creating process 140-2 transmits an alert to a user of the phone plan, notifying the user that a different phone plan offered by the phone service provider may result in lower phone bills for international phone calls. In another example embodiment, the rules engine may determine a requirement 131 that users of the phone service should be notified when their phone bills exceed a predefined threshold. The application creating process 140-2 creates an alert based on this new requirement 131, and transmits the alert to a user of the phone service when that user's phone bill surpasses the predefined threshold.

Figure 7:
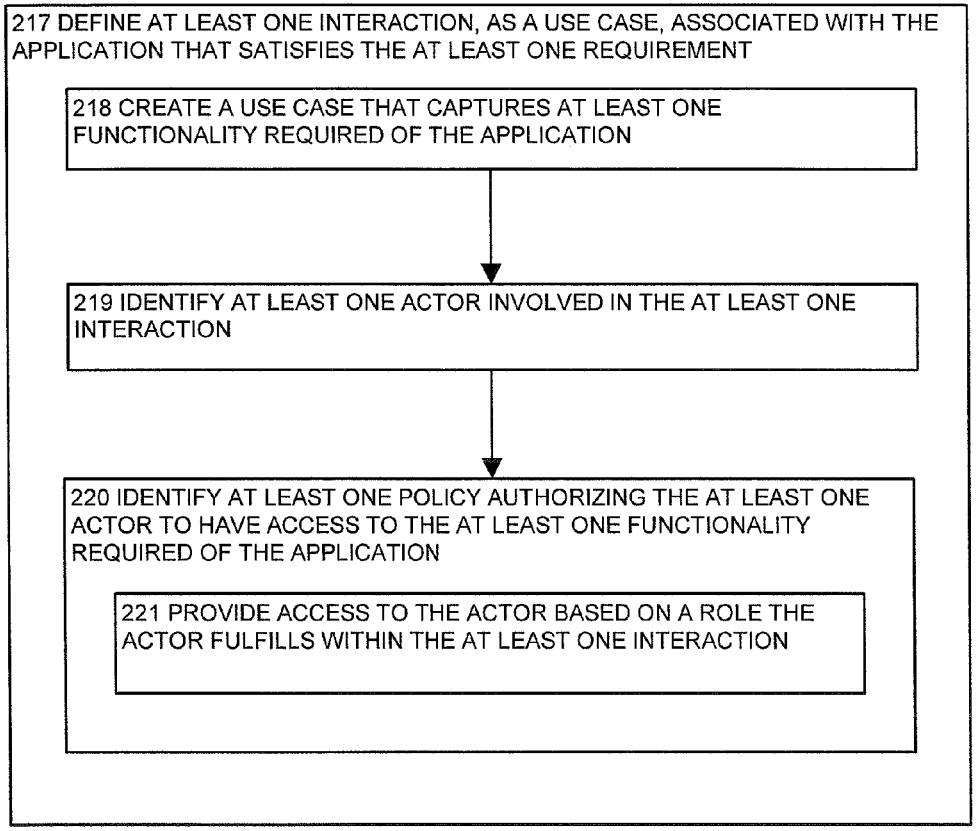
FIG. 7 illustrates a flowchart of a procedure performed by the system of FIG. 1 when the application creating process defines at least one interaction, as a use case, associated with the application that satisfies at least one requirement, according to one embodiment disclosed herein.

FIG. 7 is a flowchart of the steps performed by the process 140-2 when it defines at least one interaction 132 associated with the application 135 that satisfies at least one requirement 131.

In step 217, the application creating process 140-2 defines at least one interaction 132 associated with the application 135 that satisfies at least one requirement 131. In an example embodiment, the interaction 132 is the basis of the use case that is used to generate the code for the application 135. A use case may specify an interaction between an actor 108 and the application 135. The use case may also specify what data is to be inputted into the application 135, and what is the expected response from the application 135.

In step 218, the application creating process 140-2 creates a use case that captures at least one functionality required of the application 135. In an example embodiment, the interaction 132 (that satisfies a requirement 131), associated with the application 135, is captured as a use case, and rendered within a file. The use case details a sequence of events that should occur during operation of the application 135 that satisfies the requirement 131.

In step 219, the application creating process 140-2 identifies at least one actor 108 involved in at least one interaction 132. In an example embodiment, the use cases include an actor 108 (i.e., a user interacting with the application 135). The use case may specify a role the actor has during an interaction the actor 108 has with the application 135. The use case may detail the use experience the actor 108 should experience during an interaction 132 with the application 135.

In step 220, the application creating process 140-2 identifies at least one policy authorizing at least one actor 108 to have access to at least one functionality required of the application 135. In an example embodiment, creation of the use case may also involve specifying different access rights (to the application 135) that different actors 108 may have when interacting with the application 135. For example, a customer making a purchase from a web site may have different access rights to the web site than a customer who has paid a premium for a subscription to the web site allowing that user increased access to different web pages within the web site.

In step 221, the application creating process 140-2 provides access to the actor 108 based on a role the actor 108 fulfills within at least one interaction 132. In an example embodiment, the application creating process 140-2 associates policies (that authorize access) with roles. The roles are assigned to different actors 108 within the use cases created to satisfy the requirements 131 of the application 135. Thus, the actors 108 are granted access to components 134 of the application 135 based on their roles within the interaction 132 (i.e., the use case).

FIG. 8 is a flowchart of the steps performed by the process 140-2 when it processes at least one file with a code generating engine 133 to automatically generate at least one interactive component 134 of the application 135.

In step 222, the application creating process 140-2 processes at least one file with a code generating engine 133 to automatically generate at least one interactive component 134 of the application 135. In an example embodiment, the application creating process 140-2 uses the use case (rendered as a file) that was generated as a result of the requirements 131 specified during the discovery phase. The code generating engine 133 processes the file (i.e., the documented use case) to produce code that is capable of operating within the application 135.

In step 223, the application creating process 140-2 determines, from at least one file associated with at least one interaction 132, a category of data associated with at least one interaction 132. The category includes at least one of:
  i) data to display to at least one actor 108,
  ii) data to retrieve from at least one actor 108.

In an example embodiment, a file is created from the interaction 132 (i.e., the use case). The code generating engine 133 determines what data in the file is to be displayed within the application 135, and what data is needed from an actor 108 interacting with the application 135.

In step 224, the application creating process 140-2 provides a graphical user interface 160 capable of rendering the category data associated with at least one interaction 132. For example, if the application 135 is a web based application, the application creating process 140-2 provides a graphical user interface 160 to be rendered within a browser.

In step 225, the application creating process 140-2 creates at least one eXtensible Markup Language (XML) file, for example, an XML datastream defining the category data associated with at least one interaction 132. In an example embodiment, the code generating engine 133 creates an XML datastream that defines the data to display to an actor 108, and the data to retrieve from the actor 108 during an interaction between the actor 108 and the application 135.

In step 226, the application creating process 140-2 generates at least one web page from at least one eXtensible Markup Language (XML) file, for example, an XML datastream. The web page renders the category data associated with at least one interaction 132. The code generating engine 133 processes the XML datastream along with an eXtensible Stylesheet Language Transform (XSLT) that transforms the XML to a HyperText Markup Language (HTML) web page. The web page contains the data to display to an actor 108. The web page also contains form fields in which to retrieve data from the actor during an interaction between the actor 108 and the application 135.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of creating an application, the method comprising:
  receiving at least one non-executable description of user activity with respect to a first version of the application;
  processing the non-executable description of user activity through a code-generating engine to automatically generate at least one interactive component of the application, wherein the processing of the non-executable description of user activity through the code-generating engine includes creating at least one executable object based on the non-executable description of user activity; and
  implementing the at least one interactive component within the first version of the application to generate a second version of the application, wherein the implementing of the at least one interactive component within the first version of the application includes:
    adding the at least one executable object to the first version of the application to create the second version of the application;
    generating a run-time instance of the second version of the application;
    receiving an instance of the user activity by the run-time instance of the second version of the application; and
    responding to the user activity via an invocation of the at least one executable object in the run-time instance of the second version of the application.

2. The method of claim 1, wherein receiving the at least one non-executable description of user activity with respect to the first version of the application includes:
  receiving a description of at least one functionality to be added to the first version of the application, wherein the at least one functionality at least partially responds to the user activity.

3. The method of claim 2, comprising:
  receiving the description of at least one functionality to be added to the first version of the application prior to an implementation of the second version of the application.

4. The method of claim 2, wherein receiving the description of the at least one functionality to be added to the first version of the application includes:
  receiving a description of an update to at least one functionality of the first version of the application, wherein the update to the at least one functionality of the first version of the application formatted according to a non-executable psuedo code.

5. The method of claim 1, wherein receiving the at least one non-executable description of user activity with respect to the first version of the application includes:
  receiving a description of at least one Graphical User Interface (GUI) event formatted according to a non-executable psuedo code, wherein the GUI event comprises at least (i) expected user input and (ii) an expected response from the second version of the application.

6. The method of claim 1, wherein receiving the at least one non-executable description of the user activity with respect to the first version of the application includes:
  receiving a description of a first Graphical User Interface (GUI) event formatted according to a non-executable psuedo code, wherein the first GUI event comprises at least (i) expected input from a first user, (ii) a detection of a first level of access associated with a first user and (iii) a response from the second version of the application based on the first level of access associated with the first user.

7. The method of claim 6, wherein receiving the at least one non-executable description of the user activity with respect to the first version of the application further includes:
  receiving a description of a second GUI event formatted according to the non-executable psuedo code, wherein the second GUI event comprises at least (i) expected input from a second user, (ii) a detection of a second level of access associated with a second user and (iii) a response from the second version of the application based on the second level of access associated with the second user, wherein the response based on the second level of access differs from the response based on the first level of access.

8. A non-transitory computer readable storage medium comprising executable instructions encoded thereon operable on a computerized device to perform processing comprising:
  at least one instruction for creating an application, the method comprising:
  at least one instruction for receiving at least one non-executable description of user activity with respect to a first version of the application;
  at least one instruction for processing the non-executable description of user activity through a code-generating engine to automatically generate at least one interactive component of the application, wherein the at least one instruction for processing the non-executable description of user activity through the code-generating engine includes at least one instruction for creating at least one executable object based on the non-executable description of user activity; and at least one instruction for implementing the at least one interactive component within the first version of the application to generate a second version of the application, wherein the at least one instruction for implementing the at least one interactive component within the first version of the application includes:
  at least one instruction for adding the at least one executable object to the first version of the application to create the second version of the application;
  at least one instruction for generating a run-time instance of the second version of the application;
  at least one instruction for receiving an instance of the user activity by the run-time instance of the second version of the application; and
  at least one instruction for responding to the user activity via an invocation of the at least one executable object in the run-time instance of the second version of the application.

9. The computer readable storage medium of claim 8, wherein the at least one instruction for receiving the at least one non-executable description of user activity with respect to the first version of the application includes:
  at least one instruction for receiving a description of at least one functionality to be added to the first version of the application, wherein the at least one functionality at least partially responds to the user activity.

10. The computer readable storage medium of claim 9, comprising:
  at least one instruction for receiving the description of at least one functionality to be added to the first version of the application prior to an implementation of the second version of the application.

11. The computer readable storage medium of claim 9, wherein the at least one instruction for receiving the description of the at least one functionality to be added to the first version of the application includes:
  at least one instruction for receiving a description of an update to at least one functionality of the first version of the application, wherein the update to the at least one functionality of the first version of the application formatted according to a non-executable psuedo code.

12. The computer readable storage medium of claim 8, wherein the at least one instruction for receiving the at least one non-executable description of user activity with respect to the first version of the application includes:
  at least one instruction for receiving a description of at least one Graphical User Interface (GUI) event formatted according to a non-executable psuedo code, wherein the GUI event comprises at least (i) expected user input and (ii) an expected response from the second version of the application.

13. The computer readable storage medium of claim 8, wherein the at least one instruction for receiving the at least one non-executable description of the user activity with respect to the first version of the application includes:
  at least one instruction for receiving a description of a first Graphical User Interface (GUI) event formatted according to a non-executable psuedo code, wherein the first GUI event comprises at least (i) expected input from a first user, (ii) a detection of a first level of access associated with a first user and (iii) a response from the second version of the application based on the first level of access associated with the first user.

14. The computer readable storage medium of claim 13, wherein the at least one instruction for receiving the at least one non-executable description of the user activity with respect to the first version of the application further includes:
  at least one instruction for receiving a description of a second GUI event formatted according to the non-executable psuedo code, wherein the second GUI event comprises at least (i) expected input from a second user, (ii) a detection of a second level of access associated with a second user and (iii) a response from the second version of the application based on the second level of access associated with the second user, wherein the response based on the second level of access differs from the response based on the first level of access.

15. A computer system comprising:
  a processor;
  a memory unit that stores instructions associated with an application executed by the processor; and
  an interconnect coupling the processor and the memory unit, enabling the computer system to execute the application and perform operations of:
    receiving at least one non-executable description of user activity with respect to a first version of the application;
    processing the non-executable description of user activity through a code-generating engine to automatically generate at least one interactive component of the application, wherein the processing of the non-executable description of user activity through the code-generating engine includes creating at least one executable object based on the non-executable description of user activity; and
    implementing the at least one interactive component within the first version of the application to generate a second version of the application, wherein the implementing of the at least one interactive component within the first version of the application includes:
      adding the at least one executable object to the first version of the application to create the second version of the application;
      generating a run-time instance of the second version of the application;
      receiving an instance of the user activity by the run-time instance of the second version of the application; and
      responding to the user activity via an invocation of the at least one executable object in the run-time instance of the second version of the application.

16. The computer system of claim 15, wherein receiving the at least one non-executable description of the user activity with respect to the first version of the application includes:
  receiving a description of a first Graphical User Interface (GUI) event formatted according to a non-executable psuedo code, wherein the first GUI event comprises at least (i) expected input from a first user, (ii) a detection of a first level of access associated with a first user and (iii) a response from the second version of the application based on the first level of access associated with the first user; and
  receiving a description of a second GUI event formatted according to the non-executable psuedo code, wherein the second GUI event comprises at least (i) expected input from a second user, (ii) a detection of a second level of access associated with a second user and (iii) a response from the second version of the application based on the second level of access associated with the second user, wherein the response based on the second level of access differs from the response based on the first level of access.

\* \* \* \* \*